April 29, 1947. G. A. ADAIR 2,419,753

FISH HOOK RETAINING CLIP

Filed Jan. 4, 1946

INVENTOR.

GEORGE. ALTON ADAIR

BY *Victor J. Evans & Co.*

ATTORNEYS

Patented Apr. 29, 1947

2,419,753

UNITED STATES PATENT OFFICE 2,419,753

FISHHOOK RETAINING CLIP

George Alton Adair, Elmira, N. Y.

Application January 4, 1946, Serial No. 639,057

2 Claims. (Cl. 43—28)

The invention relates to a fish hook retaining clip, and more especially to a clip for spoon hook or fishing lure.

The primary object of the invention is the provision of a clip of this character, wherein the fish hook can be conveniently and effectively attached to the spoon or lure body or the quick and easy removal of one from the other, the clip being of novel construction and is unique in its arrangement, as it is susceptible for attaching or detaching one part to and from other.

Another object of the invention is the provision of a clip of this character, wherein the parts when attached together will be firm and secure without accidental separating either from strain or otherwise.

A further object of the invention is the provision of a clip of this character, which is simple in construction, thoroughly reliable and efficient in operation, readily and easily handled, strong, durable, enabling quick and easy attachment and detachment of parts to and from each other, and inexpensive to manufacture and install.

With these and other objects in view the invention consists in the features of construction, combination and arrangement of parts as will be hereinafter more fully described illustrated in the accompanying drawing, which discloses the preferred embodiment of the invention and pointed out in the claims hereunto appended.

In the accompanying drawing.

Similar reference characters indicate corresponding parts throughout the several views in the drawing.

Figure 1:
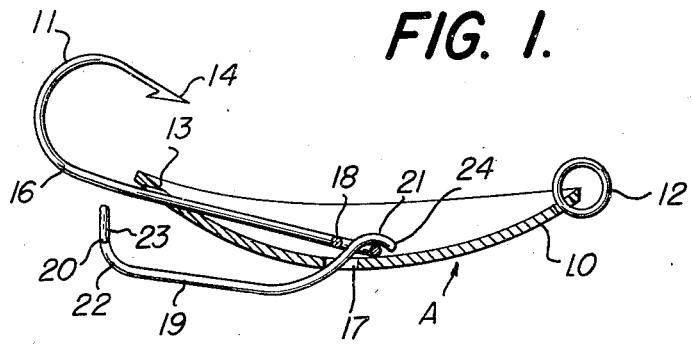
Figure 1 is a vertical longitudinal sectional view through a spoon hook showing the clip constructed in accordance with the invention in a partially applied position.
Figure 2:
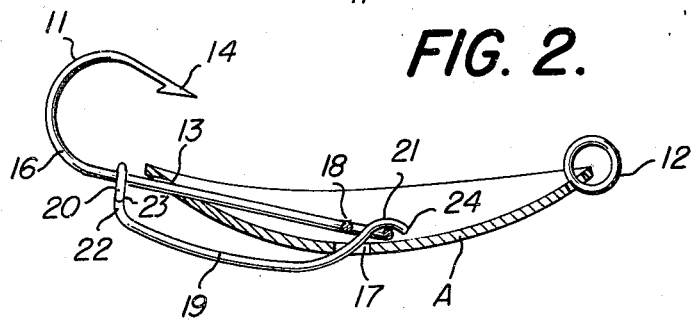
Figure 2 is a view similar to Figure 1 showing the clip in a completely applied position.

Referring to the drawing in detail, particularly Figures 1 and 2, A denotes generally a spoon hook, having the spoon body 10 and a fish hook 11 respectively, and such body is of somewhat rigid and springy sheet material, preferably highly polished, having the general outline and appearance of a minnow. The lead or head portion of this spoon body 10 is fitted with a loose ring 12 for the attaching of a fishing line thereto as is usual.

Next to the trailing end of the body 10 is formed a hole 13 forming a clearance for the bill 14 of a fishing hook for the threading of the said body onto the stem 16 of this hook. In addition to the hole 13 there is provided in the body 10 at a determined point midway of the length thereof a hole 17, the eye terminal 18 of the stem 16 of the hook being adapted to be brought into register with this hole 17, so that the latter can be attached by the clip constituting the present invention and hereinafter described.

The clip constituting the present invention, comprises a length of inherently springy wire 19 which is formed with opposite hook ends 20 and 21 respectively, the end 20 being laterally offset by an elbow 22 to have the bill 23 engage in a lateral direction over the stem 16 of the hook 15, while the end 21 is curved to have its bill 24 needle threaded through the hole 17 in the body 10 for fulcrum hooking engagement with the terminal 18 of the said hook, as best seen in Figure 2 of the drawing. In this manner the hook is releasibly latched to the body 10, the initial fitting of the clip being best seen in Figure 1 of the drawing. In Figures 1 and 2 of the drawing it is noted that the major portion of the stem 16 of the hook 15 lies within the spoon body 10 with the bill 14 of the hook from the concaved side of such body.

Figure 3:
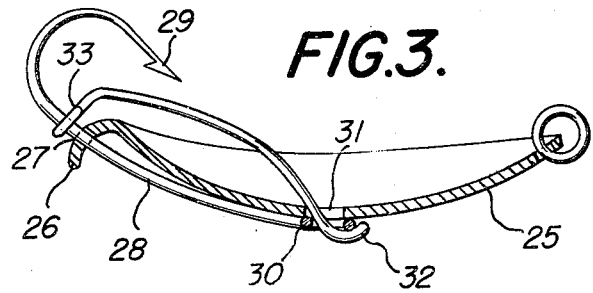
Figure 3 is a view similar to Figure 1 showing a slight modification.
Figure 4:
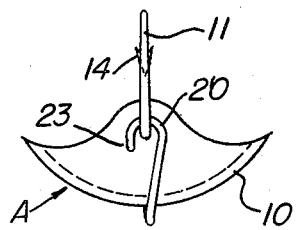
Figure 4 is an end elevation.

In Figure 3 of the drawing, there is shown a slight modification, wherein the trailing end of the body 25 is provided with a curled ear 26 extending in the direction of the convexed side of such body 25 and having a hole 27 through which is threaded the stem 28 of the hook 29, which stem is inherently springy, so that the eye terminal 30 of the hook 29 can be brought close to and in register with the hole 31 in the body 25 at the convexed side thereof to have the bill 32 of the clip engageable with the terminal 30 from the inside of the body. The bill 33 of the clip is brought into snapped engagement with the stem 28 next to the ear 26, the clip engagement being reversed to that condition shown in Figures 1 and 2 of the drawing.

The clips in both instances as shown in Figures 1 to 4 of the drawing are constructed identical with each other, while the spoon constructions slightly vary from one another, as should be obvious. It is necessary that the clip be slightly distorted when applying the same for the attachment of the hook to the spoon.

The clip is usable as taught by the drawing and preceding description for the attaching and detaching of one part to another, whether it be a lure, spoon or what not.

What is claimed is:

1. The combination of a pair of separable parts, one having a stem provided with an eye terminal and the other having a pair of spaced holes; one hole receiving the stem, and a clip having opposite hook ends; one hook end being detachably engaged with the stem next to the hole receiving the same and the other hook end detachably engaged with the eye terminal when such other hook end is passed through the other hole of the pair.

2. The combination of a pair of separable parts, one having a stem provided with an eye terminal and the other having a pair of spaced holes; one hole receiving the stem, and a clip having opposite hook ends; one hook end being detachably engaged with the stem next to the hole receiving the same and the other hook end detachably engaged with the eye terminal when such other hook end is passed through the other hole of the pair, the said clip being a single length inherently resilient member.

GEORGE ALTON ADAIR.

REFERENCES CITED

The following references are of record in the file of this patent:

UNITED STATES PATENTS

| Number | Name | Date |
| --- | --- | --- |
| 1,739,590 | Hill | Dec. 17, 1929 |
| 1,893,686 | Schilpp | Jan. 10, 1933 |
| 734,703 | Harlow | July 28, 1903 |
| 1,050,759 | Betts et al. | Jan. 14, 1913 |
| 1,763,031 | Yates | June 30, 1930 |